US005947672A

United States Patent [19]

Cohen

[11] Patent Number: 5,947,672

[45] Date of Patent: Sep. 7, 1999

[54] LUBE OIL PLUG IDENTIFICATION TAG

[75] Inventor: Samuel L. Cohen, Fort Wayne, Ind.

[73] Assignee: Navistar International Transportation Corp, Chicago, Ill.

[21] Appl. No.: 09/095,428

[22] Filed: Jun. 10, 1998

[51] Int. Cl.[6] ........................................ F16B 21/18

[52] U.S. Cl. ........................ 411/525; 411/908; 411/512; 411/339; 40/310

[58] Field of Search ........................ 40/310, 311, 316, 40/673; 411/525, 526, 527, 908, 338, 339, 512

[56] References Cited

U.S. PATENT DOCUMENTS 1,353,531 9/1920 Heard ........................ 40/310
3,062,557 11/1962 Underwood ........................ 411/533 X
4,784,418 11/1988 Pearson et al. ........................ 411/525 X

*Primary Examiner*—Cassandra H. Davis
*Attorney, Agent, or Firm*—Jeffrey P. Calfa; Dennis K. Sullivan

[57] ABSTRACT

An identification tag for various size lube oil plugs for mobile vehicles. The identification tag has a mounting hole with an intentional flash in each comer. Each side to the hole has a flap with a living hinge adjacent. The living hinges run between the flashes. The flaps will pivot on installation to allow engagement of the inner edges of the flaps on receiving slots of the receiving slots of the various size lube oil plugs.

7 Claims, 3 Drawing Sheets

LUBE OIL PLUG IDENTIFICATION TAG

BACKGROUND OF THE INVENTION

The present invention relates to an identification tag for various size lube oil plugs for mobile vehicles. Mobile vehicles such as medium and heavy duty trucks and school buses require lube oil plugs which must be labeled. The labeling provides warnings on the proper lubricants to use or not use in the system. The plugs have a square upper end with a receiving slot or groove at the same height on all four sides of the upper end. The tags are engaged to the plugs at the groove on the upper end at the receiving slot. At least two different diameter size plugs are required for medium and heavy duty truck vehicles. Although seemingly trivial the installation of tags on these plugs can go array during vehicle construction, resulting in rework and extra costs. The lube oil plug identification tag is safer to install due to its materials and shape. These properties also make it considerably easier to install. The Fit All identification tag has a mounting hole with an intentional flash in each comer. Each side to the hole has a flap with a living hinge adjacent. The living hinges run between the flashes.

PRIOR ART

Heretofore, different sized metal tags were used to label lube oil plugs on medium and heavy duty truck vehicles. The prior art metal plugs had to be specifically sized for the different sized plugs. For instance International® trucks manufactured by Navistar International Transportation Corp. have both three quarter inch (¾") diameter and one inch (1") diameter lube oil plugs. The prior art lube oil plug tags were flat circular pieces with a square hole in the middle corresponding to the upper ends of the lube oil plugs. A prior art tag is showed in FIGS. 6 and 7. Flaps on each internal edge of the square holes were bent slightly in one direction. An inner edge of the flaps would engage the groove in the upper end of the oil plugs upon a worker pushing the tag onto the plug. The metal material and the essentially fixed flap angle make each tag fit only one pre-determined size lube oil plug. Additionally, the prior art metal plugs had sharp metal edges which could cut a worker's hand during installation. The metal tags could only be installed in one direction due to the direction of the prior art fixed angle flaps. Heretofore, an oil plug identification tag which may be installed on various size oil plugs has not been suggested.

SUMMARY OF THE INVENTION

Accordingly, it is a primary object of the invention to provide a lube oil plug identification tag which fits on various size oil plugs. A second object of the invention is to provide a lube oil plug identification tag which may be installed on an oil plug in either direction. A third object of the invention is to provide a lube oil plug identification tag without injury sensitive sharp metal edges.

The primary object, as well as other objects, is met by lube oil plug identification tag which has an intentional flash in each comer of its mounting hole. Each side to the mounting hole has a flap with living hinge adjacent. The living hinges run between the flashes. The flaps and living hinges allow the plug to be installed in either direction.

BRIEF DESCRIPTION OF THE DRAWINGS

Other objects and advantages of the invention will become more apparent upon perusal of the detailed description thereof and upon inspection of the drawings in which:

FIG. 4 is a partial top perspective view of a lube oil plug that the lube oil plug identification tag of FIG. 1 is designed to be installed on.

DESCRIPTION OF THE PREFERRED EMBODIMENT

Figures 1, 2, 3:
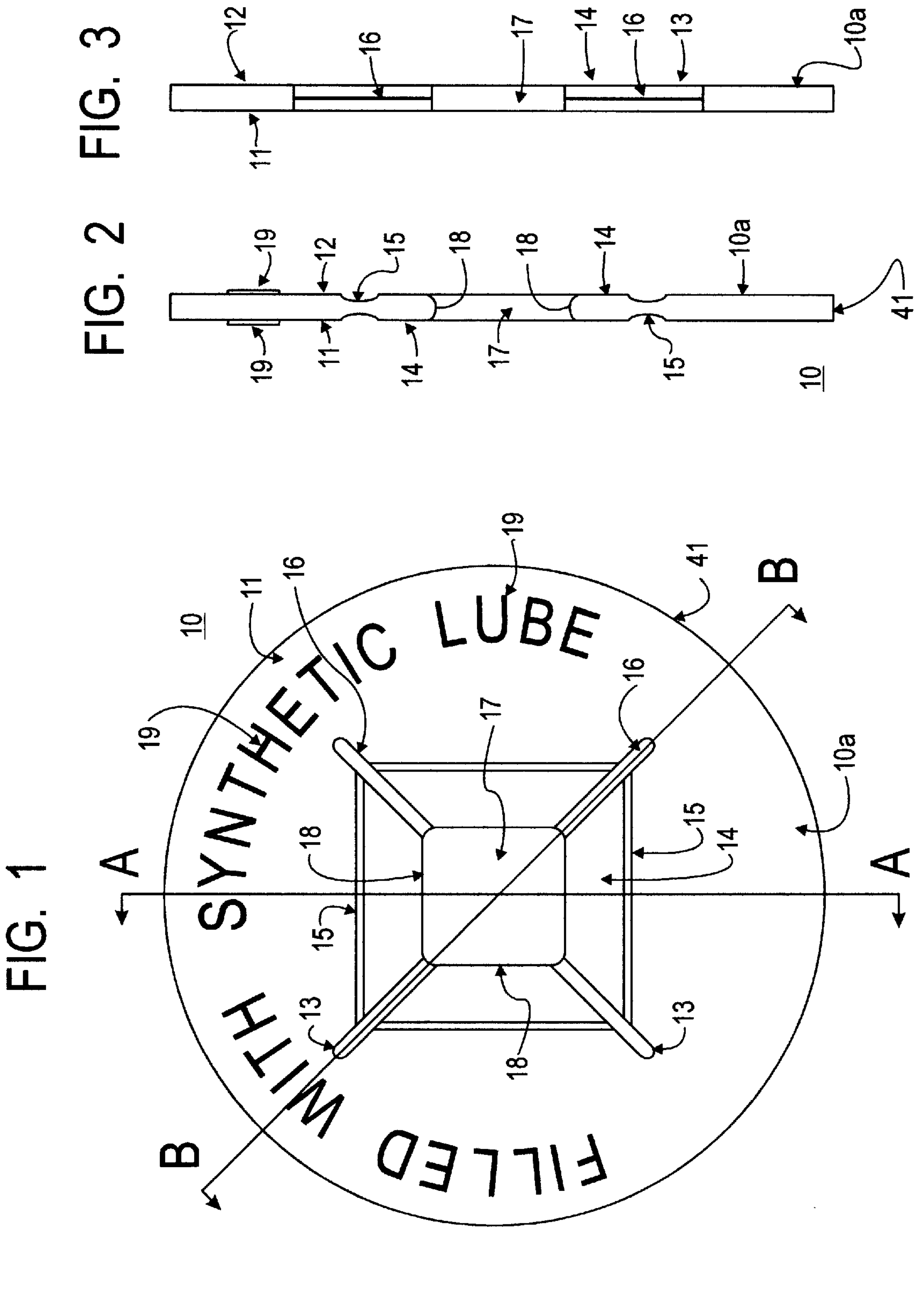
FIG. 1 is a top view of a lube oil plug identification tag made in accordance with this invention.
FIG. 2 is cut-away side view at line 2–2 of the lube oil plug identification of FIG. 1.
FIG. 3 is a cut-away side view at line 3–3 of the lube oil plug identification tag of FIG. 1.
Figure 5:
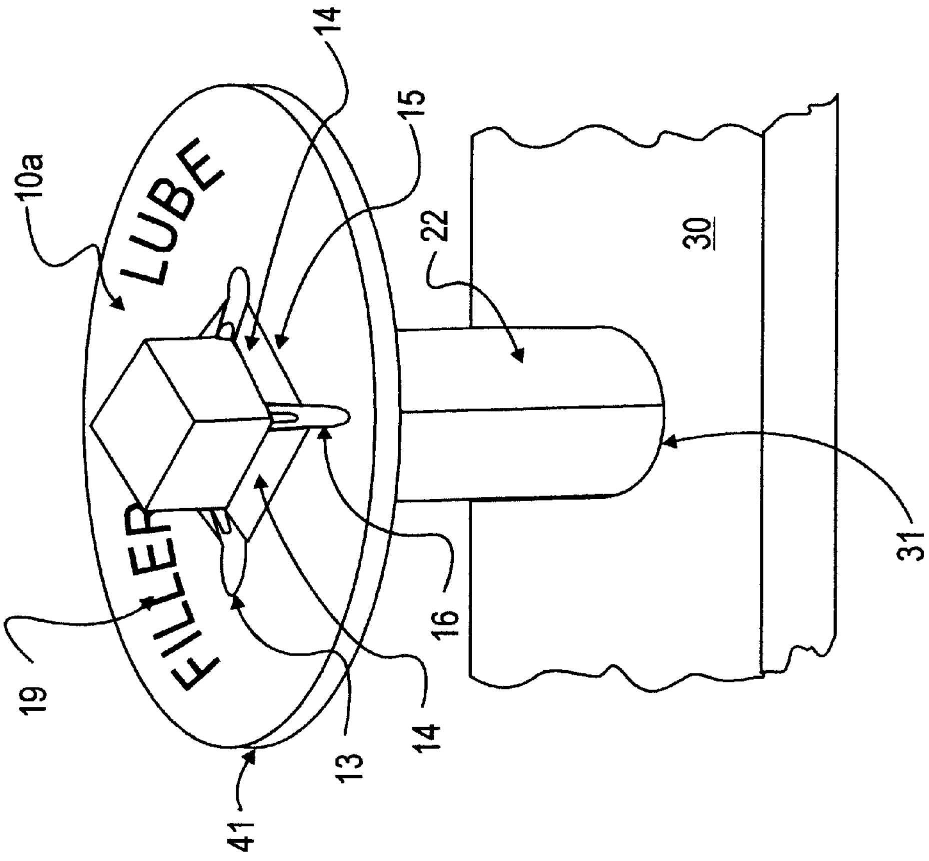
FIG. 5 is the lube oil plug of FIG. 4 with the lube oil plug identification of FIG. 1 installed.
Figure 4:
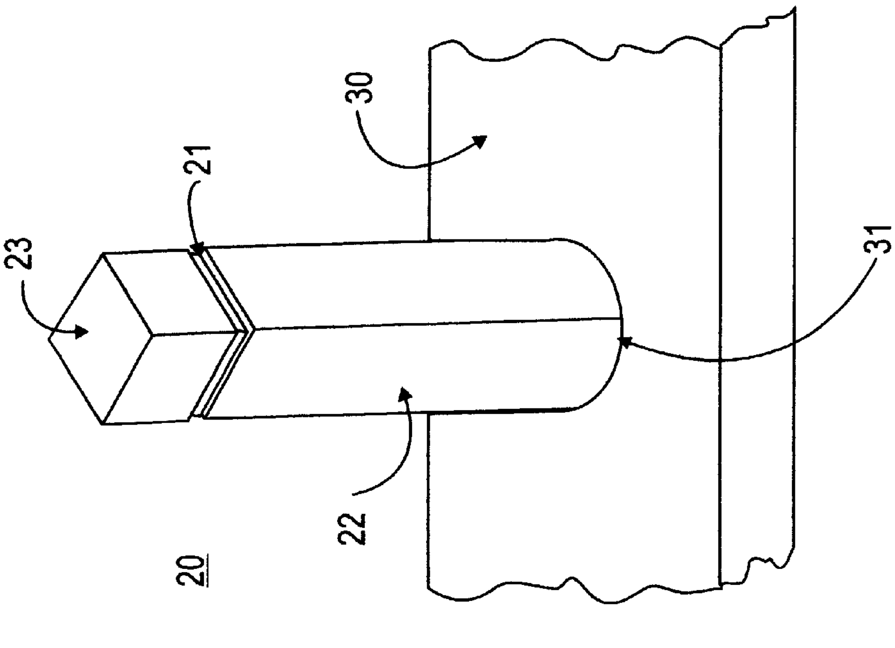
Figure 7:
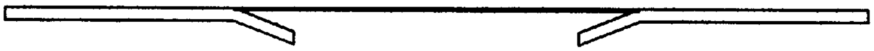
FIG. 7 is a side view of the prior art lube oil tag of FIG. 6.
Figure 6:
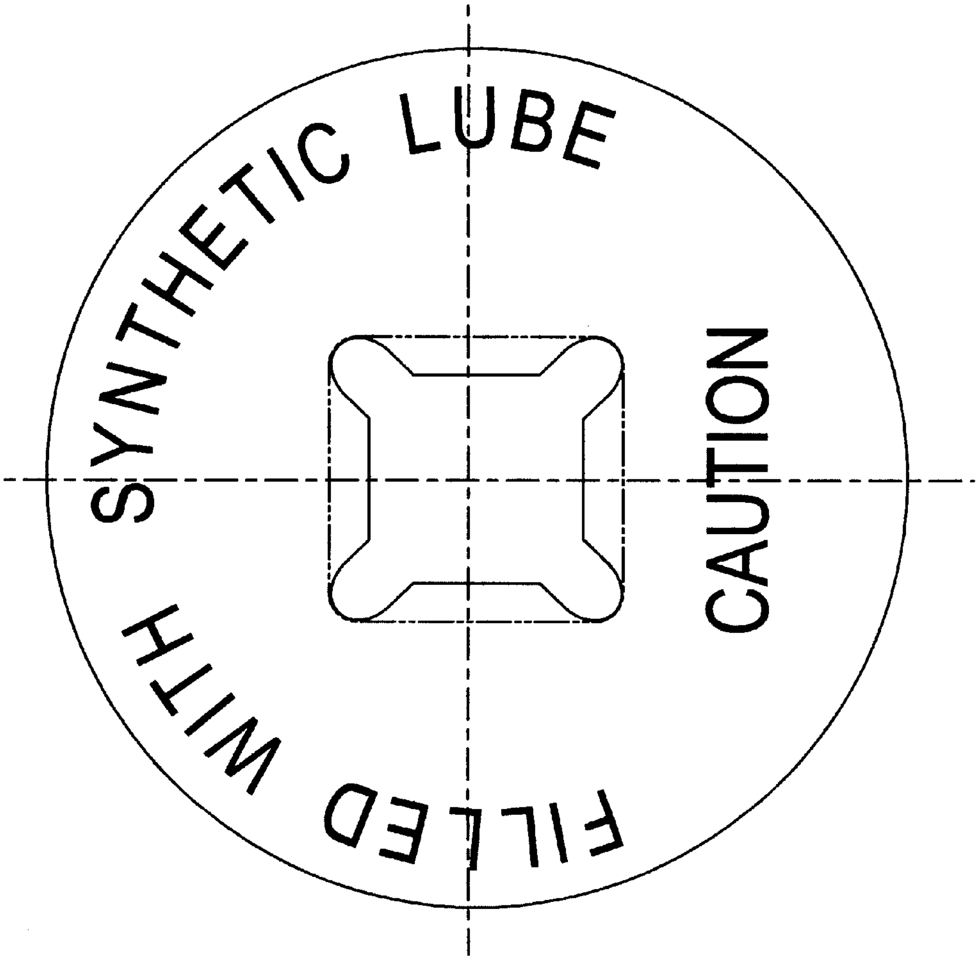
FIG. 6 is a top view prior art lube oil plug identification tag.

Referring now to the drawings in greater detail, there is shown, in FIGS. 1–3, a lube oil plug identification tag 10 designed to be installed on the lube oil plug 20 shown in FIGS. 4 and 5. The fit-all lube oil plug identification tag 10 has a relatively flat body piece **10*a* with a first face 11 and a second face 12. The fit-all identification tag 10 is made of a plastic such as polypropylene. There is a mounting hole 17 through the fit-all body piece 10*a* from the first face 11 to the second face 12. The fit-all identification tag 10 is shown round in the top view but it may be any shape. Round is preferred to prevent sharp comers which may cause personal injury on installation. At each comer of the mounting hole 17 is a flash slot 13 inside body piece 10*a* directed radially outward from the mounting hole 17. The flash slot 13 contains a thin elastic membrane of intentional flash 16. The flash 16 is a thin membrane which runs across the opening area of the flash slot 13 in the approximate center of the flash slot 13. In the preferred embodiment, the flash 16 is approximately 0.01 thick to allow flexing and ripping as the lube oil plug 20 is inserted. As will be described, the flash 16 allows the fit-all identification tag 10 to fit various size lube oil plugs 20. The mounting hole 17 may be square or rectangularly shaped defined by four (4) inner side edges 18. There is a flap 14 adjacent to each side edge 18. Each flap 14 is defined by the flash slot 13 and the living hinge 15. The living hinge 15 is comprised of a thin portion of the body piece 10*a* that is inset on both the first face 11 and the second face 12. The inset on both sides allows the living hinge 15 to flex in either direction. The flash slot 13 extends outward radially past the living hinges 15. An outer radially edge 41 of the fit-all identification tag 10 has rounded comers 42 where the outer radial edge 41 meets the first face 11 and the second face 12. These rounded comers reduce sharp dangerous edges. In the preferred embodiment, the rounded corners 42 of the outer radially edge 41 will have a 0.03' curved 5 radius. Both the first face 11 and the second face 12 will have raised letters 19 which will describe the oil usage or conditions of an oil system 92 (not shown). The raised letters 19 may be a decal or molded onto the body piece 10*a* during body piece 10*a*** manufacture.

A lube oil plug 20 is shown installed in an oil port 31 of an oil using component 30 of the oil system. The lube oil plug 20 has a body 22. The body 22 has a tag receiving slot 21 which runs on each side of an upper end of the body 22. To install, the fit-all identification tag 10 is lined up with mounting hole 17 directly over a top side 23 of the lube oil plug body 22. As the body 22 enters the mounting hole 17, the flaps 14 pivot on the living hinges 15 outwards until the body 22 is surrounded on each side by the inner side edges 18 of the flaps 14. The flash 16 will elastically stretch to allow the is pivoting of the living hinges 15. The flash 16 will also partially rip as necessary to allow the lube oil plug body 22 to enter the mounting hole 17. The fit-all identification tag 10 will move down the body 22 until the inner side edges 18 engage the receiving slots 21 of the lube oil plug 30. The flaps 14 will pivot on living hinges 15 inward to engage the flaps 14 to the receiving slots 21 of the lube oil plug 20. The flaps 14 pivot inward due to contraction of the remaining un-ripped flash 16.

The amount the flash 16 that will rip and stretch is dependent upon the cross sectional area of the particular size lube oil plug 20. The flash 16, the flaps 14 and the living hinges 15 will allow the fit-all identification tag 10 to be installed on various size lube oil plugs 20 and to be installed with either the first face 11 up or the second face 12 up. The raised letters 19 on either side makes installation less susceptible to installation errors.

As described above, the fit-all lube oil plug identification tag 10 of the present invention provides a number of advantages, some of which have been described above and others of which are inherent in the invention. Also modifications may be proposed to the fit-all lube oil plug identification tag 10 without departing from the teachings herein. Accordingly, the scope of the invention is only to be limited as necessitated by the accompanying claims.

I claim:

1. A lube oil plug identification tag for installation on a lube oil plug of an oil system with the lube oil plug having a receiving slot on each side and a rectangular cross sectional body, comprising:

(a) a flat body piece with a first face and a second face;

(b) said body piece has a four cornered mounting hole through said body piece from said first face to said second face;

(c) a flash slot in said body piece at each of said comers of said mounting holes;

(d) said flash slots are directed radially outward from said mounting hole;

(e) said flash slots contain an elastic intentional flash;

(f) said intentional flash is centered and runs across said flash slot;

(g) said mounting hole is defined by four inner side edges;

(h) a flap defined by said flash slots and a living hinge adjacent to each said inner side edge, with said flash slots extending outward radially past said living hinges;

(i) said living hinges being comprised of a thinner portion of said body piece that is inset on both first face and said second face; and (j) said mounting hole, said inner side edges and said flaps are sized to allow insertion of the body of the lube oil plug and engagement of said inner side edges to the receiving slots of the lube oil plug.

2. The lube oil plug identification tag of claim 1, wherein:

(a) said body piece, said flaps, and said intentional flash are made of a plastic.

3. The lube oil plug identification tag of claim 2, where:

(a) said plastic is a polypropylene.

4. The lube oil plug identification tag of claim 3, wherein:

(a) said body piece is circular shaped when viewed directly above said first face.

5. The lube oil plug identification tag of claim 4, wherein:

(a) said body piece has rounded comers at outer radial edge.

6. The lube oil plug identification tag of claim 5, wherein:

(a) said rounded comers have a 0.03' internal radius.

7. The lube oil plug identification tag of claim 4, wherein:

(a) said intentional flash is 0.01' thick.

* * * * *